Nov. 2, 1948.   J. C. HICKMAN   2,453,012
FLEXIBLE ROTARY COUPLING
Filed Feb. 4, 1947   2 Sheets-Sheet 1
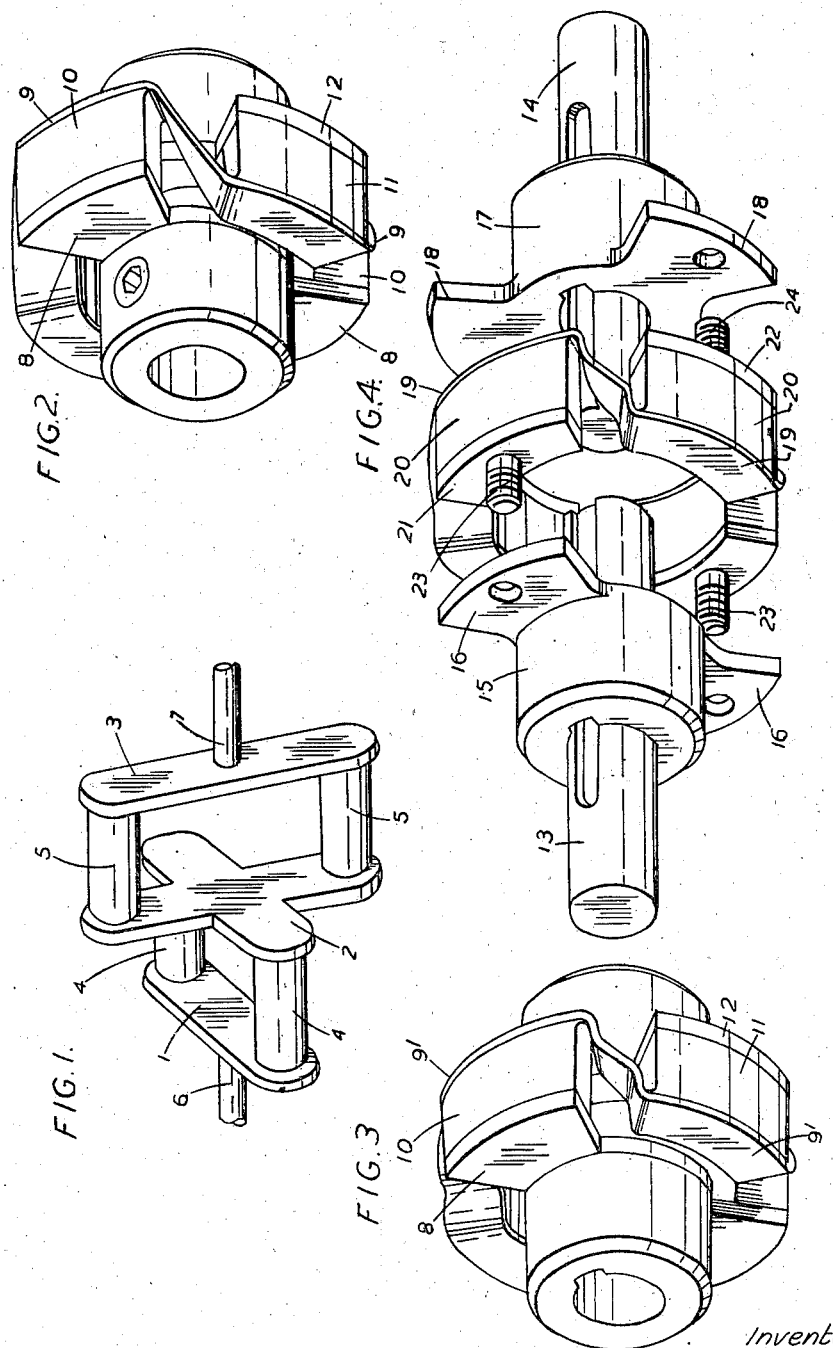
Inventor:—
James C. Hickman,
by Smith, Michael and Gardiner.
Associate Attorneys.

Nov. 2, 1948.  J. C. HICKMAN  2,453,012
FLEXIBLE ROTARY COUPLING
Filed Feb. 4, 1947  2 Sheets-Sheet 2
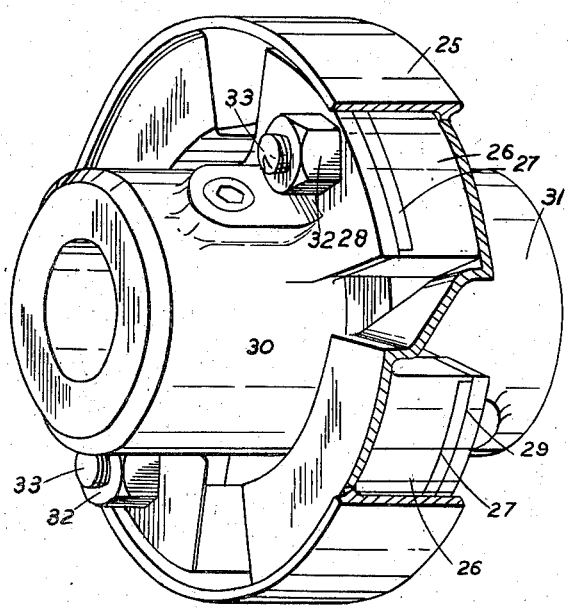
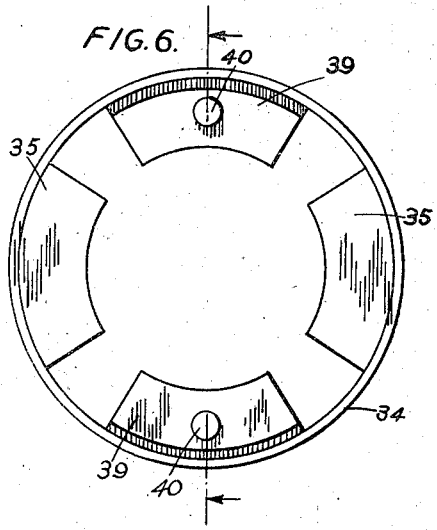
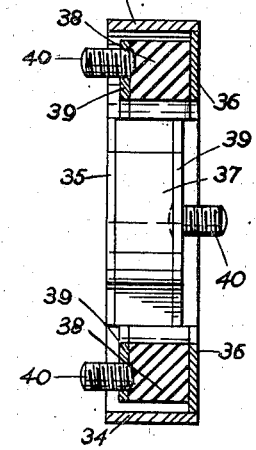
Inventor:—
James C. Hickman,
by
Smith, Michael & Gardiner,
Associate Attorneys.

Patented Nov. 2, 1948

2,453,012

UNITED STATES PATENT OFFICE 2,453,012

FLEXIBLE ROTARY COUPLING

James Claude Hickman, Colne, England, assignor to J. H. Fenner and Company Limited, Colne, England, a British company Application February 4, 1947, Serial No. 726,313
In Great Britain February 20, 1946

6 Claims. (Cl. 64—11)

This invention relates to flexible power transmission couplings which are employed for the purpose of preventing the transmission of vibrations from a driving to a driven machine and, in particular, for reducing bearing stresses in the coupled machines when their axes may be subjected to angular or eccentric misalignment.

The coupling according to the present invention comprises driving and driven flanged members each connected by two flexible elements to a centrally disposed member, such that a line joining the two elements connected to the driving member is substantially at right angles to a line joining the elements connected to the driven member thereof, while each flexible element is secured at one end face to the intermediate member and at its opposite end face to the driving or the driven member respectively, and the torque is transmitted through the flexible elements only between such end faces thereof. When such a coupling is strained in torsion or by eccentric misalignment, the flexible elements are stressed mainly in shear, and when the coupling is strained as by angular misalignment, the flexible elements are stressed mainly in bending.

The invention is illustrated in the accompanying drawings in which:

Figure 1 shows a diagrammatic isometric representation of an elementary coupling of the type described;

Figures 2 and 3 are isometric views showing practical forms of the invention;

Figure 4 is an isometric view showing the parts of a coupling, similar to that of Figure 3, separated out;

Figure 5 is an isometric view of another form of the coupling with its flange portion partly cut away;

Figure 6 is a face view, and

Figure 7 is a vertical section showing an alternative form of the intermediate member.

In Figure 1, the numerals 1, 2 and 3 show respectively the driving flanged member, the centrally disposed intermediate member and the driven flanged member, members 1 and 3 being rigidly connected to the driving and driven shafts 6 and 7 respectively. Two pairs of flexible elements 4 and 5, of any convenient shape, are bonded or otherwise secured at their extremities between the members 1 and 2, and 2 and 3, serving to transmit the driving torque from member 1 to member 3.

It will be understood that this construction comprises in effect two couplings connected in series, and that the flexibility in torsion and for lateral displacement of the driven shaft relative to the driving shaft is twice that of a single coupling as represented say by a driving flanged member 1, two flexible elements 4 and a driven flanges member 2.

A further important feature of the construction illustrated is the low resistance to relative angular misalignment of the driving and driven shafts. For example, when shaft 7 is angularly displaced downwards, relative to shaft 6, in a plane at right angles to that containing elements 4, the upper element 5 is stressed in tension, the lower element 5 is stressed in compression, and a bending moment is applied to the two elements 4. It is well known that a flexible member, as for example rubber or like material is, for a given shape, most easily deformable by bending, less easily deformable in shear, and least easily deformable in tension or in compression. The resistance to bending of elements 4 can be still further reduced by diminishing the modulus of the section of the elements, and this is easily achieved without unduly increasing the diameter of the coupling, assuming the length of the coupling is maintained constant. For example, the angular displacement of the extremities of the elements 4 due to a bending moment M is given by $$\theta \alpha \frac{M}{I}$$

where I is the moment of inertia of the section of the element. For simplification assume that the cross section of each element is circular, then $$\theta \alpha \frac{M}{D^4}$$

where D is the diameter of the section.

The torque T transmitted by the coupling is proportional to $D^2R$ where R is the effective radius of action of the flexible elements from the axis 6 or 7 respectively. Hence $T^2 \alpha D^4 R^2$ so that $$D^4 \alpha \frac{T^2}{R^2}$$

Hence $$\theta \alpha \frac{M}{T^2} R^2$$

If now the bending moment and the torque transmitted remain constant while $\theta$, the angular displacement, is changed to $\theta_1$ and R is changed to $R_1$ we have $$\theta_1 \alpha \frac{M}{T^2} R_1^2$$

Hence $$\frac{\theta_1}{\theta} = \frac{R_1^2}{R^2}$$

or the angular displacement varies as the square of the radial distance of the centres of the flexible elements from the axis of the coupling. If the cross section of elements 4 is reduced to give an increase of say 10% in the angular deflection under constant bending moment, an increase of some 5% in the effective diameter of the coupling is required, assuming the shear stress in the elements under constant torque is to be kept constant.

Assuming the angular displacement to remain constant in direction elements 5 are strained by bending when the coupling is rotated through 90°; at intermediate angles the elements are strained in combined bending, tension and compression and, when transmitting torque, in shear also.

For maximum flexibility under all conditions of operation and misalignment, the coupling should be of maximum possible effective length and the elements 4 and 5 should be of the minimum possible section.

Figure 2 shows a practical embodiment of the invention. The flanges of the driving and driven members 8 and 12 comprise two oppositely disposed sectors, each of included angle less than 90°, secured to bosses or other means for attachment to shafts. The centrally disposed intermediate member 9 has the form of a waved washer with alternate raised and depressed portions. Arcuate flexible elements 10 are surface-bonded or otherwise secured at their extremities to appropriate portions of members 8 and 9.

Similar arcuate flexible elements 11 are bonded or otherwise secured between appropriate portions or members 9 and 12.

Such a construction fulfills a two-fold purpose. The two pairs of flexible elements may be displaced relatively axially of the coupling and thereby reduce the actual length of the coupling without any sacrifice of flexibility in any direction. The portions of the centrally disposed element 9 intermediate between the raised and depressed portions, constitute a convenient means of limiting the strain on the flexible elements due to relative angular movement of members 8 and 12. For example, in the design illustrated in Figure 2, member 8 can be rotated relative to member 12 only by a predetermined amount, say 10 or 12 degrees, before members 8, 9 and 12 are in intimate contact. The faces of the member 9 may be coated with rubber or other yieldable material to give a cushioning effect when strained.

Figure 3 shows a similar construction in which the member 9¹ is of slightly modified form, other elements of the coupling being unaltered.

Figure 4 shows the parts of a coupling similar to that of Figure 3 and separated out. The shafts 13 and 14 are the driving and driven shafts to which are keyed respectively the driving member having a boss 15 and flanges 16, and the driven member having a boss 17 and flanges 18. The intermediate element consists of a waved washer 19 corresponding to that numbered 9¹ in Figure 3, having four segments of rubber or the like 20 bonded to its faces, those facing toward the left in the figure having metal plates 21 bonded to their exposed ends, and those facing toward the right having plates 22 bonded to them. In making up the coupling bolts 23 on plates 21 are passed through and secured in holes in the flanges 16, and bolts 24 on plates 22 are similarly engaged with flanges 18, the bolts being fixed by nuts (not shown).

Figure 5 shows a further form of the coupling in which the waved intermediate element has a flange 25 enclosing the flexible elements 26 and the plates 27 connected through bolts 33 and nuts 32 with the flanges 28 and 29 of the end coupling elements 30 and 31. The flange member 25 is large enough internally to accommodate any lateral displacement of the driving and driven members without fouling the flange.

Figures 6 and 7 show an alternative construction of the intermediate element in which an annular flange member 34 has plates 35 and 36 welded or otherwise secured in it in alternate segments at opposite sides. These plates 35 and 36 have the end faces of the flexible elements 37 and 38 of indiarubber or the like vulcanised to them. In the construction shown, these elements have plates 39 bonded to them carrying the bolts 40 for coupling the intermediate element to end members. Each of the plates 35 and 36 preferably extends over a circumferential width corresponding to an angle of 65° so that there are gaps between the segments of 25° as viewed from the ends.

Although metal has been mentioned for the end members, these may be of any suitable comparatively rigid material, and the intermediate member may be either substantially rigid or relatively flexible. The flexible segmental elements may be of natural or synthetic rubber composition or similar elastic material.

The faces of the flexible elements bonded or otherwise secured to the respective intermediate and end members may lie in parallel planes as shown or may form portions of the curved surface of a right circular cone or may conform to any other shape as desired.

I claim:

1. A coupling for power transmission comprising a driving member, an intermediate member and a driven member all disposed in substantially co-axial relation to one another, each of said driving and driven members comprising a boss with two oppositely disposed segmental projections thereon, each extending over less than 90° circumferentially, the segmental projections of the driving member being disposed substantially at right angles to the segmental projections of the driven member, and four resilient elements two of which are attached each at one end face to the faces of said segmental projections on said driving member and at the opposite end face to said intermediate member, while the other two resilient elements are attached each at one end face to said intermediate member and at the opposite end face to said segmental projections on said driven member, and said intermediate member having the portions thereof to which resilient elements connected to said driving member are attached disposed in a plane perpendicular to the axis and displaced from the central plane of said intermediate member toward said driven member, while the portions of said intermediate member to which resilient elements connected to said driven member are attached are disposed in a plane perpendicular to the axis and displaced from the central plane of said intermediate member toward said driving member.

2. A coupling for power transmission comprising a driving member, an intermediate member and a driven member all disposed in substantially co-axial relation to one another, each of said driving and driven members comprising a boss with two oppositely disposed segmental projections thereon, each extending over less than 90° circumferentially, the segmental projections of the driving member being disposed substantially at right angles to the segmental projections of the driven member, and four resilient elements two of which are attached each at one end face to the faces of said segmental projections on said driving member and at the opposite end face to said intermediate member, while the other two resilient elements are attached each at one end face to said intermediate member and at the opposite end face to said segmental projections on said driven member, and said intermediate member being of waved form such that said resilient elements attached to the intermediate member on one face overlap said resilient elements attached to said intermediate member on the opposite face, while connecting portions of said intermediate member extend diagonally between said resilient elements.

3. A coupling for power transmission comprising a driving member, an intermediate member and a driven member all disposed in substantially co-axial relation to one another, each of said driving and driven members comprising a boss with two oppositely disposed segmental projections thereon, each extending over less than 90° circumferentially, the segmental projections of the driving member being disposed substantially at right angles to the segmental projections of the driven member, and four resilient elements two of which are attached each at one end face to the faces of said segmental projections on said driving member and at the opposite end face to said intermediate member, while the other two resilient elements are attached each at one end face to said intermediate member and at the opposite end face to said segmental projections on said driven member, said resilient elements attached to said driving member and said resilient elements attached to said driven member being disposed so as to lie in substantially the same plane perpendicular to the axis of said coupling, while said intermediate member has its portions to which said resilient elements are attached relatively displaced along said axis respectively to right and left of a central plane in the coupling perpendicular to said axis.

4. A coupling for power transmission comprising a driving member, an intermediate member and a driven member all disposed in substantially co-axial relation to one another, each of said driving and driven members comprising a boss with two oppositely disposed segmental projections thereon, each extending over less than 90° circumferentially, the segmental projections of the driving member being disposed substantially at right angles to the segmental projections of the driven member, and four resilient elements two of which are attached each at one end face to the faces of said segmental projections on said driving member and at the opposite end face to said intermediate member, while the other two resilient elements are attached each at one end face to said intermediate member and at the opposite end face to said segmental projections on said driven member, and said intermediate member having an annular flange surrounding said resilient elements and has four segmental faces extending inwardly from said annular flange, two at one side and two at the other side thereof, and to which faces said resilient elements are attached, the positions of said segmental faces being such that said resilient elements attached to two of said segmental faces on one side are in substantially the same plane perpendicular to the axis as the resilient members attached to the other two segmental faces on the opposite side.

5. A coupling for power transmission comprising a driving member, an intermediate member, a driven member, and a plurality of resilient elements forming the effective power transmitting connection between said members, said intermediate member being formed as a waved disc with segments between the waves to which said resilient elements are affixed at alternate sides so as to extend in opposite directions therefrom alternately, said resilient elements which extend in one direction from said intermediate member being affixed at their outer faces to said driving member, and said resilient elements which extend in the other direction from said intermediate member being affixed at their outer faces to said driven member.

6. A coupling for power transmission as specified in claim 5 wherein said intermediate member has a flange around its waved portion enclosing said resilient elements and providing space for limited relative displacements of said driving and driven members.

JAMES CLAUDE HICKMAN.

REFERENCES CITED

The following references are of record in the file of this patent:

UNITED STATES PATENTS

| Number | Name | Date |
|---|---|---|
| 2,406,875 | Wallerstein, Jr. | Sept. 3, 1946 |